(12) United States Patent
Baltatu et al.

(10) Patent No.: US 8,135,180 B2
(45) Date of Patent: Mar. 13, 2012

(54) USER AUTHENTICATION METHOD BASED ON THE UTILIZATION OF BIOMETRIC IDENTIFICATION TECHNIQUES AND RELATED ARCHITECTURE

(75) Inventors: Madalina Baltatu, Turin (IT); Rosalia D'Alessandro, Turin (IT); Roberta D'Amico, Turin (IT)

(73) Assignee: Telecom Italia S.p.A., Milan (IT)

( * ) Notice: Subject to any disclaimer, the term of this patent is extended or adjusted under 35 U.S.C. 154(b) by 1264 days.

(21) Appl. No.: 10/584,506

(22) PCT Filed: Dec. 10, 2004

(86) PCT No.: PCT/EP2004/014099
§ 371 (c)(1),
(2), (4) Date: Jun. 13, 2007

(87) PCT Pub. No.: WO2005/064547
PCT Pub. Date: Jul. 14, 2005

(65) Prior Publication Data
US 2008/0019573 A1    Jan. 24, 2008

(30) Foreign Application Priority Data

Dec. 24, 2003 (WO) ............... PCT/IB03/06186
May 7, 2004 (WO) ............... PCT/EP2004/004923

(51) Int. Cl.
*G06K 9/00* (2006.01)
(52) U.S. Cl. ............ 382/115; 382/190; 713/186
(58) Field of Classification Search .......... 380/277; 382/115, 190; 713/172, 186, 193; 726/5, 726/17, 19, 28
See application file for complete search history.

(56) References Cited

U.S. PATENT DOCUMENTS

| | | | |
|---|---|---|---|
| 5,280,527 A | 1/1994 | Gullman et al. | |
| 6,185,316 B1 * | 2/2001 | Buffam | 382/115 |
| 6,546,122 B1 * | 4/2003 | Russo | 382/125 |
| 7,474,769 B1 * | 1/2009 | McAfee et al. | 382/115 |
| 7,543,156 B2 * | 6/2009 | Campisi | 713/186 |
| 7,549,161 B2 * | 6/2009 | Poo et al. | 726/5 |
| 2002/0196963 A1 | 12/2002 | Bardwell | |
| 2003/0218534 A1 | 11/2003 | LaCous | |
| 2004/0250084 A1 * | 12/2004 | Hamid | 713/186 |
| 2006/0056662 A1 * | 3/2006 | Thieme et al. | 382/115 |

FOREIGN PATENT DOCUMENTS

WO   WO 01/39134 A2   5/2001
WO   WO 03/002013 A1   1/2003

OTHER PUBLICATIONS

Housley, et al., "Internet X.509 Public Key Infrastructure Certificate and CRL Profile", Network Working Group, Request for Comments, 2459, pp. 1-129, (Jan. 1999).
B. Schneier, "Secret Splitting", Applied Cryptography, J. Wiley and Sons, Inc., publisher, Second Edition, Chapter 3 Basic Protocols, pp. 70-71.
Shamir, "How to Share a Secret", Communications of the ACM, vol. 22, No. 11, pp. 612-613, (Nov. 1979).
H. Feistel, "Cryptographic Coding for Data-Bank Privacy," IBM Thomas J. Watson Research Center, RC 2827 (#13260), Mar. 18, 1970 (58 pages).

* cited by examiner

*Primary Examiner* — Gregory M Desire
(74) *Attorney, Agent, or Firm* — Finnegan, Henderson, Farabow, Garrett & Dunner, L.L.P.

(57) ABSTRACT

A user authentication method based on the use of identification biometric techniques, including the steps of generating a reference biometric template from a first biometric image of a user to be authenticated; splitting the reference biometric template into a first and a second reference biometric template portion that can be physically separated; signing and enciphering the first and the second reference biometric template portion; storing the signed and enciphered first and second reference biometric template portion into different memories.

20 Claims, 5 Drawing Sheets

USER AUTHENTICATION METHOD BASED ON THE UTILIZATION OF BIOMETRIC IDENTIFICATION TECHNIQUES AND RELATED ARCHITECTURE

CROSS REFERENCE TO RELATED APPLICATIONS

This application is a national phase application based on PCT/EP2004/014099, filed Dec. 10, 2004, the content of which is incorporated herein by reference, and claims the priority of PCT/EP04/004923, filed May 7, 2004, and PCT/IB03/06186, filed Dec. 24, 2003, the content of both of which is incorporated herein by reference.

BACKGROUND OF THE INVENTION

1. Field of the Invention

The present invention refers in general to the field of secure authentication system. More particularly, the present invention refers to a user authentication method based on the utilization of biometric identification techniques and related architecture.

2. Description of the Related Art

Authentication is the process by which an entity, such as a financial institution, a bank, etc., identifies and verifies its customers or users to itself and identifies and verifies itself to its customers or users.

Authentication includes the use of physical objects, such as cards and/or keys, shared secrets, such as Personal Identification Numbers (PIN's) and/or passwords, and biometric technologies such as voice prints, photos, signatures and/or fingerprints. Biometric tasks include, for example, an identification task and a verification task. The verification task determines whether or not the person claiming an identity is really the person whose identity has been claimed.

The identification task determines whether the biometric signal, such as a fingerprint, matches that of someone already enrolled in the system.

Various biometrics have been considered for use with smart cards, such as fingerprints, hand prints, voice prints, retinal images, handwriting samples and the like.

An example of a biometric-based smart card is shown in U.S. Pat. No. 5,280,527 describing a credit card sized token (referred to as biometric security apparatus) containing a microchip, in which a sample of the authorised user's voice is stored. In order to gain access to an account, the user must insert the token into a designated slot of an ATM, and then speak with the ATM. If a match is found between the user's voice and the sample enrolment of the voice stored into the microchip, access to the account is granted.

Although the system disclosed in U.S. Pat. No. 5,280,527 reduces the risks of unauthorised access, if compared with conventional PIN-based systems, however, to the extent that the credit card and the microchip disposed therein can be tampered with, the system does not provide the level of reliability and security that is often required in nowadays finance transactions.

In WO-A-0139134 a security system is further disclosed, comprising: a central unit with a biometric sensor to detect biometric data representing characteristic biometric features of a person; at least one portable data carrier; a memory means for storing biometric reference data representing the biometric reference features of the person in the system; a control system capable of generating an authorisation signal to control a functional unit depending on a comparison between the biometric data detected by the sensor and the reference data.

In the security system proposed in such document, the reference data, that are compared with the biometric data detected by the sensor to ascertain the authenticity of the user, are not wholly stored into the data carrier, in the conventional manner, but are splitted, partly in the data carrier and partly in the reading device. Only the combination of data carrier and reading device will produce the complete information needed for authentication.

The invention is particularly advantageous if the biometric sensor is a fingerprint sensor. A fingerprint sensor determines the locally resolved position of minutiae of the fingerprint. The minutiae are singular points of the papillary lines of a fingerprint. These might be end points, branches or similar points of the papillary lines of the fingerprint. The local position is determined depending on the distance from a reference point or radius to the angle related to a reference direction.

In order to personalise the data carrier, the fingerprint of the data carrier owner is reproduced and appropriate reference values are determined for radius and angle. These values are then stored into the system. For practical purpose, the radius reference data are stored only on the data carrier and the angle reference data are stored only on the reading device. Alternatively, the angle reference data are stored in the data carrier and the distance reference data are stored on the reading device.

SUMMARY OF THE INVENTION

The Applicant faced the problem of realising a method for authenticating users based on the use of biometric identification techniques, that is secure, independent from the used biometric identification techniques and that protects user privacy.

The Applicant has observed that the above-described problem can be solved by a user authentication method based on the use of biometric identification techniques comprising the steps of: generating a reference biometric template from a first biometric image of a user to be authenticated and, afterwards, splitting the reference biometric template into a first and a second reference biometric template portion, said first and second reference biometric template portion being separable. The first and the second reference biometric template portion are then signed, enciphered and stored in different memories.

More specifically, a user authentication method based on the use of biometric identification techniques comprises an enrolment step and a verification step, said enrolment step including the steps of:

generating a reference biometric template from a first biometric image of a user to be authenticated;

splitting said reference biometric template into a first and a second reference biometric template portion;

enciphering said first and second reference biometric template portion; and storing each one of said reference biometric template portions into a different memory.

Another aspect of the present invention refers to an architecture based on the use of biometric identification techniques comprising:

at least one data enrolment system for generating a reference biometric template from a first biometric image of a user to be authenticated, said data enrolment system comprising a Host Computer for splitting said reference biometric template into a first and a second reference biometric template portion that are physically separable and for enciphering said first and second reference biometric template portion;

at least one portable data carrier associated with said user to be authenticated, said data carrier comprising a memory for storing said first signed and enciphered reference biometric template portion; and at least one data verification system comprising a memory for storing said second signed and enciphered reference biometric template portion.

Another aspect of the present invention refers to a portable data carrier associated with a user that has to be authenticated through a user authentication architecture, said data carrier including a microprocessor comprising a memory for storing a first reference biometric template portion associated with said user to be authenticated, said first reference biometric template portion being signed and enciphered, said portable data carrier being adapted to received as input, from said user authentication architecture, a second reference biometric template portion and a live template associated with said user to be authenticated, said second reference biometric template portion and said live template being signed and enciphered, said microprocessor further comprising:

a processing logic for deciphering said first and second reference biometric template portion and for recomposing therefrom said reference biometric template associated with said user to be authenticated;

a comparing logic for comparing said reference biometric template recomposed with said live template and sending a result of said comparison to said user authentication architecture.

Another aspect of the present invention refers to a data verification system comprising an electronic device and a portable data carrier associated with a user that has to be authenticated, said data carrier being adapted to store a first reference biometric template portion associated with a user to be authenticated, said first reference biometric template portion being signed and enciphered;

said electronic device comprising:

a memory adapted to store a second reference biometric template portion associated with a user to be authenticated, complementary with said first portion, said second reference biometric template portion being signed and enciphered;

an image acquiring and processing device for generating a live template;

said electronic device being adapted to encipher and sign said live template, transmit said second reference biometric template portion and said live template to said portable data carrier and authenticate said user depending on the result of a comparison performed by said data carrier between said live template and a reference biometric template of said user to be authenticated, said reference biometric template being recomposed by using said first and second reference biometric template portion.

A further aspect of the present invention deals with a computer program product that can be loaded in the memory of at least one electronic processor and comprising portions of software code to perform the process according to the invention when the product is executed on a processor: in this context such diction must be deemed equivalent to the mention of a means readable by a computer comprising instructions to control a network of computers in order to perform a process according to the invention. The reference to "at least one electronic processor" is obviously aimed to point out the possibility of carrying out the solution according to the invention in a de-centralised context.

Further preferred aspects of the present invention are disclosed in the dependent claims and in the present description.

BRIEF DESCRIPTION OF THE DRAWINGS

The features and the advantages of the present invention will result from the herein below description of an embodiment, provided as a non-limiting example, with reference to the enclosed drawings, in which.

DETAILED DESCRIPTION OF THE INVENTION

Figure 1:
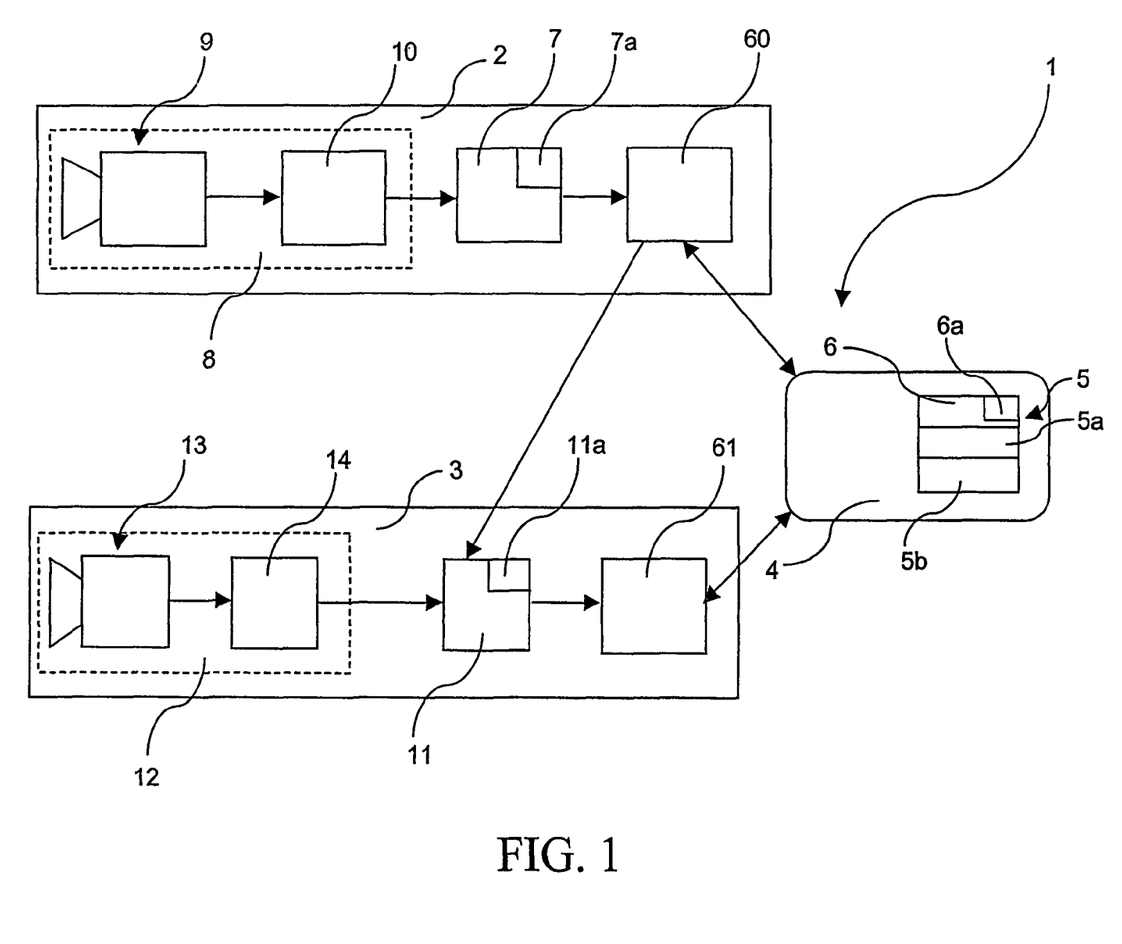
FIG. 1 is a schematic representation of a user authentication architecture according to the invention.

With reference to FIG. 1, the user authentication method according to the invention is applied to a user authentication architecture 1 comprising a data enrolment system 2, a data verification system 3 and a portable data carrier 4, this latter one belonging to a user that has to be authenticated. The data carrier 4 can be a substrate whose sizes are substantially rectangular, such as for example an access card, a credit card, a debit card, an identification card, a smart card, a SIM card or a secure digital card. In any case, the data carrier 4 is equipped with a microprocessor 5 including a processing logic 5a, a comparing logic 5b and a memory 6.

Always with reference to FIG. 1, in a preferred embodiment, the data enrolment system 2 comprises a Host Computer 7, for example a personal computer, a business computer, etc., having enough memory 7a to store biometric data of a user that has to be authenticated. The data enrolment system 2 can also include an image acquiring and processing device 8, connected to the Host Computer 7, and a data reading/writing device 60, also connected to the Host Computer 7 realising the interface with the data carrier 4. The data reading/writing device 60 can be, for example, a smart card reader, if the data carrier 4 is a smart card, or a cellular phone, if the data carrier 4 is a SIM card.

Specifically, the image acquiring and processing device 8 includes: a sensor 9 of the biometric type, for example a television camera, to detect a first biometric image (i.e., biometric data sample) of the user that has to be authenticated, for example a face template; an image processor 10, connected between sensor 9 and Host Computer 7, to generate a reference biometric template from the user biometric image, detected through sensor 9.

Preferably, the data enrolment system 2 is a separated system from the data verification system 3 and is placed in a secure environment.

In a preferred embodiment, the data verification system 3 comprises an electronic device 11, for example a personal computer, a palmtop computer, a cellular telephone, an handheld PC, a smart-phone, having enough memory 11a to store biometric data of a user that has to be authenticated.

The data verification system 3 can also comprise: a data base, of a known type and therefore not shown in FIG. 1, managed by a remote system connected to the electronic device 11; an image acquiring and processing device 12; a data reading/writing device 61 realising the interface with the data carrier 4. The image acquiring and processing device 12 and the data reading/writing device 61 are both connected to the electronic device 11. Moreover, the data reading/writing device 61 can be, for example, a smart card reader, if the data carrier 4 is a smart card, or a cellular phone, if the data carrier 4 is a SIM card.

Specifically, the image acquiring and processing device 12 comprises: a sensor 13, of the biometric type, for example a television camera, to detect a second biometric image (the face template) of the user that has to be authenticated. The image acquiring and processing device 12 also includes an image processor 14, connected between sensor 13 and electronic device 11, to generate a live template from the user biometric image detected through the sensor 13. The electronic device 11 can also comprise a processing logic (not shown in FIG. 1) able to read and interpret the comparison operation result between reference biometric template and live template performed by the data carrier 4, as will be described more in detail below.

It is to be remarked that, in the following description, for enciphering and deciphering biometric data, cryptographic algorithms of the asymmetrical type, for example the RSA algorithm, are preferably used. In particular, these algorithms are based on the use of two different keys in the data enciphering and deciphering steps and on the existence of a PKI (Public Key Infrastructure), for example based on standard X.509 described in R. Housley, Internet X.509 Public Key Infrastructure Certificate and CRL Profile, RFC 2459, 1999.

The user authentication method, according to the invention, will now be described with reference to the flow diagrams shown in FIGS. 2-3.

Figure 2:
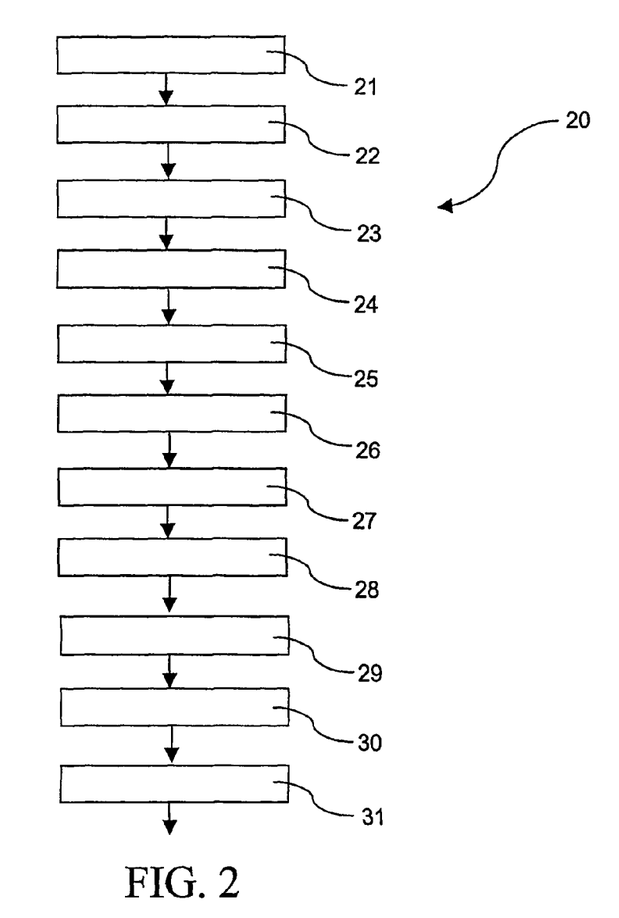
FIG. 2 shows a flow diagram related to implementing a first step of a user authentication method according to the invention.
Figure 3:
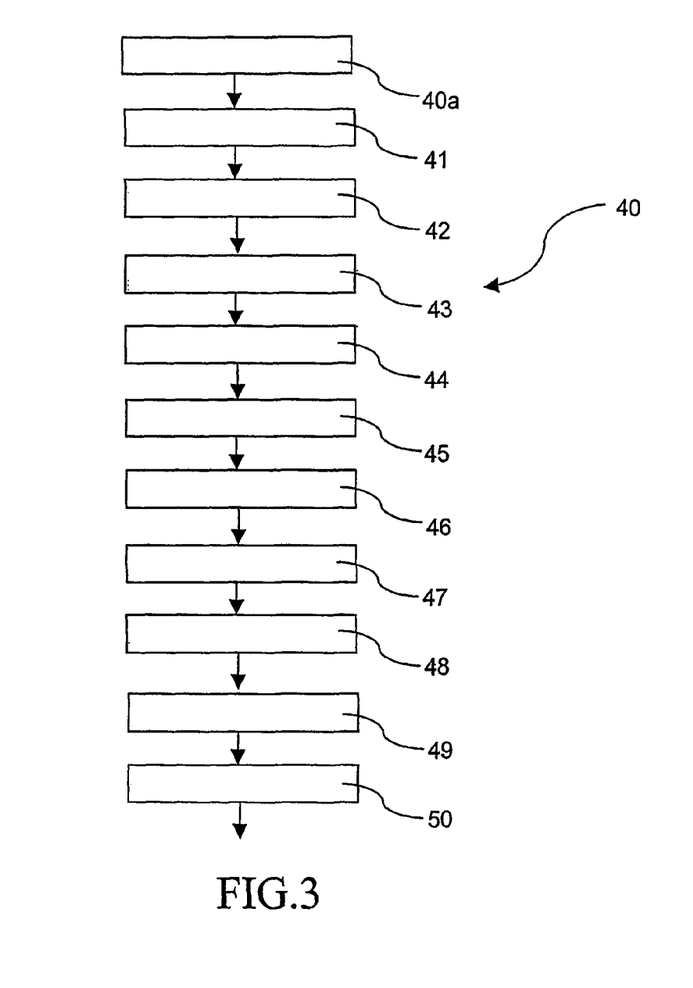
FIG. 3 shows a flow diagram related to implementing a second step of the user authentication method according to the invention.

In a preferred embodiment, the method according to the invention comprises an enrolment step 20, performed by the data enrolment system 2 and shown in FIG. 2, and a verification step 40, performed by the data verification system 3 and the data carrier 4 and shown in FIG. 3.

With reference to FIG. 2, initially the enrolment step 20 provides an initialisation step 21 of the data enrolment system 2, of the data verification system 3 and the data carrier 4.

Specifically, the initialisation step 21 provides:

storing, in the memory 7a of Host Computer 7, a pair of public $KE_{pub}$ and private $KE_{pr}$ keys associated with the data enrolment system 2, the related digital certificate $C_E$ containing the public key $KE_{pub}$ signed with the private key issued by a secure Certification Authority and, possibly, the digital certificate $C_{AC}$ of the same Certification Authority;

storing, in the memory 6 of data carrier 4, a pair of public $KU_{pub}$ and private $KU_{pr}$ keys associated with the user to be authenticated, the related digital certificate $C_U$ containing the public key $KU_{pub}$ signed with the private key of the secure Certification Authority and, possibly, the digital certificate $C_{AC}$ of the same Certification Authority. Alternatively, the data carrier 4 initialisation can provide for the generation of the pair of public and private keys $KU_{pub}$, $KU_{pr}$ aboard the data carrier 4 itself (on-card) and the transmission of the certification request for the public key $KU_{pub}$ to the secure Certification Authority. The initialisation process is then finalised by installing the user digital certificate $C_U$ on the data carrier 4 and distributing the related certificate to the data enrolment system 2 and the data verification system 3. All these operations can be performed in the microprocessor 5; and storing, in the memory 11a of electronic device 11, a file containing a pair of public $KV_{pub}$ and private $KV_{pr}$ keys associated with the data verification system 3, the related digital certificate $C_V$ containing the public key $KV_{pub}$ signed with the private key issued by the secure Certification Authority and, possibly, the digital certificate $C_{AC}$ of the same Certification Authority.

The enrolment step 20 then proceeds with detecting, through the sensor 9, a first biometric image of the user to be authenticated (block 22). Afterwards, the first biometric image is transferred to the image processor 10 that generates the reference biometric template (block 23).

The reference biometric template is then stored into the memory 7a of the Host Computer 7 (block 24). Afterwards, the Host Computer 7 decomposes the reference biometric template into a first and a second reference biometric template portion (block 25), using a splitting algorithm that will be described more in detail herein below, and then destroys the original copy of the reference biometric template (block 26).

At this time, the Host Computer 7 signs the first and the second reference biometric template portion with the private key $KE_{pr}$ of the data enrolment system 2 (block 27) and then enciphers the two portions with the public key $KU_{pub}$ of the user to be authenticated (block 28).

Afterwards, the Host Computer 7 transfers the first reference biometric template portion onto the data carrier 4 (block 29). Here, the first reference biometric template portion is stored into a protected area 6a (shown in FIG. 1) of the memory 6 (block 30). For example, the memory 6a area can be protected through PIN.

In another embodiment of the present invention, the Host Computer 7 can transfer the first reference biometric template portion into a memory included in the reading/writing device 61, for example in a cellular phone memory or in any personal processing device (PC, PDA, handheld device, etc.) memory.

Communication between data enrolment system 2 and data carrier 4 can occur for example though the communication protocol implemented in the reading/writing device 60. The reading/writing device 60 is also equipped with a logic (an application program) that checks the data transfer.

The second reference biometric template portion is instead transferred and stored into the memory 11a of the electronic device 11 (block 31).

Alternatively, the second reference biometric template portion can be transferred and stored into the data base.

The transfer of the second reference biometric template portion from data enrolment system 2 to electronic device 11, or to data base, can occur by using methods of the OOB ("Out Of Band") type. In particular, these methods assume that data are not transferred in a network, but are transferred using alternative communication channels, such as, for example, a telephone channel or the traditional mail.

Less preferably, the transfer of the second reference biometric template portion can occur through a modem or a communication network, for example a TCP/IP or GSM network.

With reference now to FIG. 3, the verification step 40 starts when a user, by entering the data carrier 4 into the data reading/writing device 61, asks the user architecture 1 to be authenticated (block 40a). Under these conditions, the data verification system 3, through the sensor 13, detects a second biometric image of the user that has to be authenticated (block 41). This second biometric image is then transferred to the image processor 14 that generates the live template (block 42). Afterwards, the live template is sent to the electronic device 11 that signs it with the private key $KV_{pr}$ of the data verification system 3 and enciphers it with the public key of the user $KU_{pub}$ (block 43).

At that time, the electronic device 11, through the reading/writing device 61, transmits to the data carrier 4 both the live template and the second reference biometric template portion, this latter one stored locally or recovered by the data base, enclosing a univocal Nonce (namely an aleatory value, used a single time in a cryptographic scheme) to guarantee the authenticity of the current data verification session (block 44). The univocal Nonce is also enciphered and signed. Such operation guarantees for example the protection from the so-called replay attacks (attacks where the attacking person is an authorised user that re-proposes to the system, in a following authentication session, a previously positive authentication session as regards the interested user).

Communication between data verification system 3 and data carrier 4 can occur for example through the communication protocol implemented in the reading/writing device 61. The reading/writing device 61 is also equipped with a logic (an application program) that checks the data transfer.

Afterwards, the data carrier 4, using its own private key $KU_{pr}$, deciphers the second reference biometric template portion and checks its signature by using the public key $KE_{pub}$ of the data enrolment system 2 (block 45). In case of check success, the data carrier 4, through a recomposition algorithm, stored into the memory 6 and shown below, recomposes the reference biometric template (block 46) using the now deciphered second reference biometric template portion and the first reference biometric template portion, stored into the protected memory area 6a.

Afterwards, the data carrier 4, using its own private key $KU_{pr}$, deciphers the live template transmitted by the data verification system 3 and checks its signature by using the public key $KV_{pub}$ of the data verification system 3 (block 47).

If all previously-described check operations realised through the processing logic 5a of the microprocessor 5, have a positive result, the data carrier 4 performs a comparison operation between the reference biometric template and the live template (block 48).

Preferably, the comparison operation is performed by the comparing logic 5b of the microprocessor 5 as an atomic operation using known comparison functions depending on the biometric identification techniques used. For example, for the face template, as comparison functions, those provided in the Principal Component Analysis (Eigenfaces) or Local Features Analysis, or Neural Networks or 3D or wavelet Gabor, etc. techniques can be used.

Afterwards, the data carrier 4 transfers to the data verification system 3 the comparison operation result together with the univocal Nonce previously received by the data verification system itself (block 49).

The comparison operation result and the univocal Nonce can for example be sent as a message signed with the user private key $KU_{pr}$ and enciphered with the public key $KV_{pub}$ of the data verification system 3.

At this time, the electronic device 11, using the private key $KV_{pr}$ of the data verification system 3, deciphers the message sent thereto by the data carrier 4, checks its signature, and, depending on the comparison operation result, grants or not the user access to the required service (block 50).

In case a data base is used for storing the second reference biometric template portion, it is necessary to make secure also the communication between electronic device 11 and remote data base managing system. This can be obtained by using, for example, the previously-described authentication, privacy and non-repudiation cryptographic mechanisms, in order to guarantee the authentication of affected parts, in addition to integrity and privacy of transferred data.

Moreover, the remote data base managing system can use access control methods, of the Access Control List type (with user authentication through userID and Password or through digital certificates) to guarantee a secure access to data contained in the data base.

Preferably, the splitting algorithm used by the data enrolment system 2 to split the reference biometric template into the two portions of reference biometric template, is a secret splitting algorithm, that can be used in the cryptographic techniques of the "secret sharing scheme" type. In this case a secret is divided into N parts, securely transferred to N entities with the property that, starting from a single part of the secret, the original cannot be rebuilt. An algorithm of this type is for example described in H. Feistel in "Cryptographic Coding for Data-Banking Privacy", IBM Research, New York, 1970.

More in detail, the splitting algorithm comprises an enrolment step in which the data enrolment system 2 that created the template t (the reference biometric template) generates a random number $t_1$ (the first reference biometric template portion) of the same size (length) of the template t. Afterwards the data enrolment system 2 applies a XOR function to t and $t_1$ to generate a value $t_2$ (the second reference biometric template portion), namely:

$$t \text{ XOR } t_1 = t_2$$

$t_1$ is then stored in a protected mode (that provides for signature and enciphering) on the data carrier 4 while $t_2$ is stored in a protected mode (that provides for signature and enciphering) on the data verification system 3 or in the central data base.

The recomposition algorithm for the template t, used by the data carrier 4 to recompose the template t from $t_1$ and $t_2$, is, mathematically, the reverse function of the previously-described splitting algorithm. In particular, the data carrier 4, after having obtained $t_2$, performs the XOR between $t_1$ and $t_2$ rebuilding the original value of the template t, namely:

$$t_1 \text{ XOR } t_2 = t.$$

If all described operations are correctly performed, the technique is secure since by possessing a single part, t1 or t2, it is not possible to obtain the template t.

The advantages that can be obtained with the described user authentication method are as follows.

Firstly, the user authentication method is secure since an hacker that tries to violate either the data carrier 4 or the data verification system 3 does not obtain enough elements to go back to the reference biometric template, since this latter one is partly stored in the data carrier 4 and partly in the data verification system 3. In this way, both user privacy compliance, and the chance of using the same biometric technique also in case of violation/corruption of only one part of the reference biometric template, are guaranteed. In fact, the reference biometric template is a piece of information depending on the used biometric technique: by applying the same biometric technique to the image of the same person, a reference biometric template is obtained that is very similar to the original one. Therefore, if the whole reference biometric template falls in the hand of an hacker, this latter one could use it for disguising as the user enabled to the service, impairing the used biometric technique. Moreover, it is plausible that, through a reverse-engineering process, the hacker can go back to the mode used by the biometric technique to produce the reference biometric template. In this way, the relevant biometric technique is no more secure.

Moreover, the user authentication method according to the invention is also advantageous in case the authentication is mandatory for the access to an on-line service, in which the operator providing the service controls the data verification system 3. In fact, the operator offering the service can go on keeping the control over the verification of the users because, according to the invention, both data carrier 4 and data verification system 3 concur in performing the verification step in a secure way that cannot be repudiated (the non-repudiation of a session implies the impossibility for a user to negate having participated into the session itself).

Moreover, the global security provided by the user authentication method according to the invention is further increased by the fact that the creation logic of the reference biometric template 11 does not reside on the data carrier 4 but on the data enrolment system 2 that, preferably, is a separate system from the data verification system 3 and placed in a secure environment. On the data carrier 4 there are only the processing logic 5a that recomposes the reference biometric template and also performs the suitable cryptographic operations and the comparing logic 5b computing the correlation between reference biometric template and live template.

It is finally clear that to the herein described and shown user authentication method and its related architecture numerous modifications and variations can be made, all falling within the scope of the inventive concept, as defined in the enclosed claims.

For example, biometric techniques can be used that are different from face recognition, such as fingerprints, hand prints, voice templates, retinal images, calligraphic samples and the like.

Furthermore, the splitting algorithm used by the data enrolment system 2 can split the template t in n portions, where $n>=2$, (e.g., $t_1, t_2, \ldots, t_n$), with the property that it is impossible to obtain t from an arbitrary number i of its portions $t_1 1$, $t_2, \ldots, t_n$, where i<n. In other words, only all the portions $t_1$, $t_2, \ldots, t_n$ combined together can recompose the original template t. The size of the single portions can vary: depending on the chosen splitting algorithm they could not equal the size of the template t.

Moreover, the user authentication method according to the invention can be applied to different scenarios, such as for example:

Stand Alone scenario, in which the user authentication method according to the invention is used to protect the access to the data verification system 3 (ex. login to personal computer, palmtop, cellular phone-SIM) by a user provided with the data carrier 4;

client-server scenario, in which the client scenario comprises the data carrier 4, preferably realised as a SIM-card, and a client portion of the data verification system 3, while the server scenario comprises a server portion of the data verification system 3. In particular, the server portion of the data verification system 3 can coincide or not with a central server (for example the server offering the required service). In this case, the client portion of the data verification system 3 can perform a more or less active role in the authentication process. For example, the client portion of the data verification system 3 can perform the function of detecting the biometric image of the user that has to be authenticated, then transferring it to the central server to which instead the live template generation is entrusted; the central server will then take care of transferring the live template to the client portion of the data verification system 3.

Alternatively, the client portion of the data verification system 3 can also generate the live template.

In both scenarios taken into account, the comparison operation between reference biometric template and live template is performed on the data carrier 4, then the recomposed reference biometric template never goes out of the data carrier 4. The result of this operation is then transferred in a secure way (for example enciphered and signed) to the central server that decides whether granting or not the authorisation.

Figure 4:
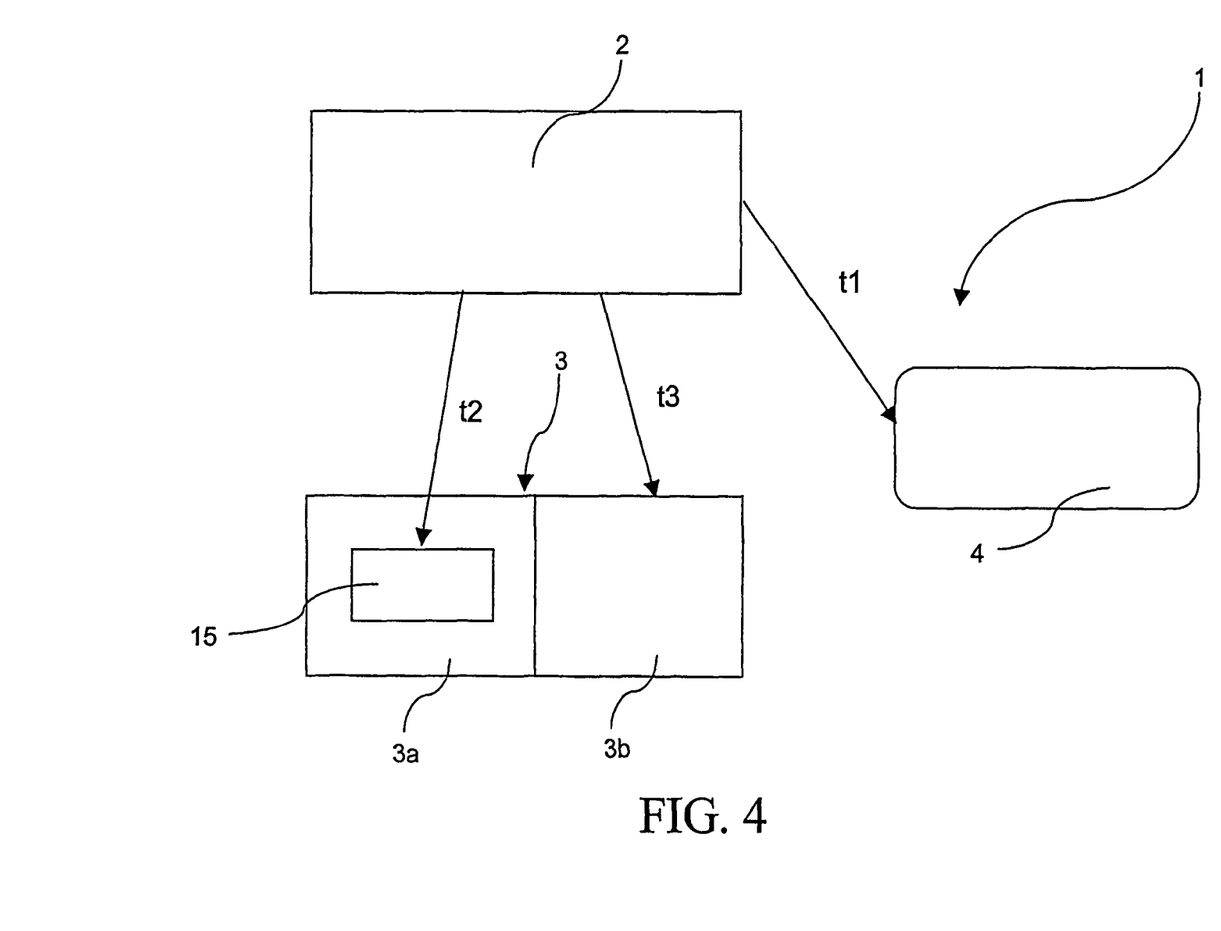
FIG. 4 is another schematic representation of a user authentication architecture according to the invention.

With reference to the client-server authentication scenario, if the central server plays an active role in the authentication process, the reference biometric template can be split, for example, in three portions: $t_1$ stored on the data carrier 4, $t_2$ stored on the central server 15, included in the server portion 3a of the data verification system 3, and $t_3$ stored on the client portion 3b of the data verification system 3, as illustrated in FIG. 4. Alternatively, also the portion $t_3$ of the reference biometric template can be stored on the server portion 3a. Interaction between all the systems is required for template recomposition and template verification.

According to the application's specific requirements, the configuration described above can also be extended to an arbitrary number of systems, each of them storing a respective portion of the splitted reference biometric template. In this case, an extended version of the previously described splitting algorithm can be used (see for example the book "Applied Cryptography" Second Edition, Chapter 3, pages 70-71", author Bruce Schneier, published by John Wiley and Sons Inc).

Specifically, for n systems involved (n>=2), n−1 random strings are generated, at an enrolment step, having the same length of the original template t. These n−1 random strings are then XORed with the template t for obtaining the n-th random string of the shared template. Each of these random strings is then distributed to the respective system and the original template t is subsequently destroyed. At a verification step all these random strings should be present to recompose the original template t.

A further scenario including n systems, each of them storing a respective portion of the original template t, can require a template sharing scheme in which only m systems, with n>m>=2, are involved in the template recomposition and verification. A sharing scheme of this type is for example described in Shamir, *How to share a secret*, Communications of the ACM, 22 (1979), pp. 612-613.

Figure 5:
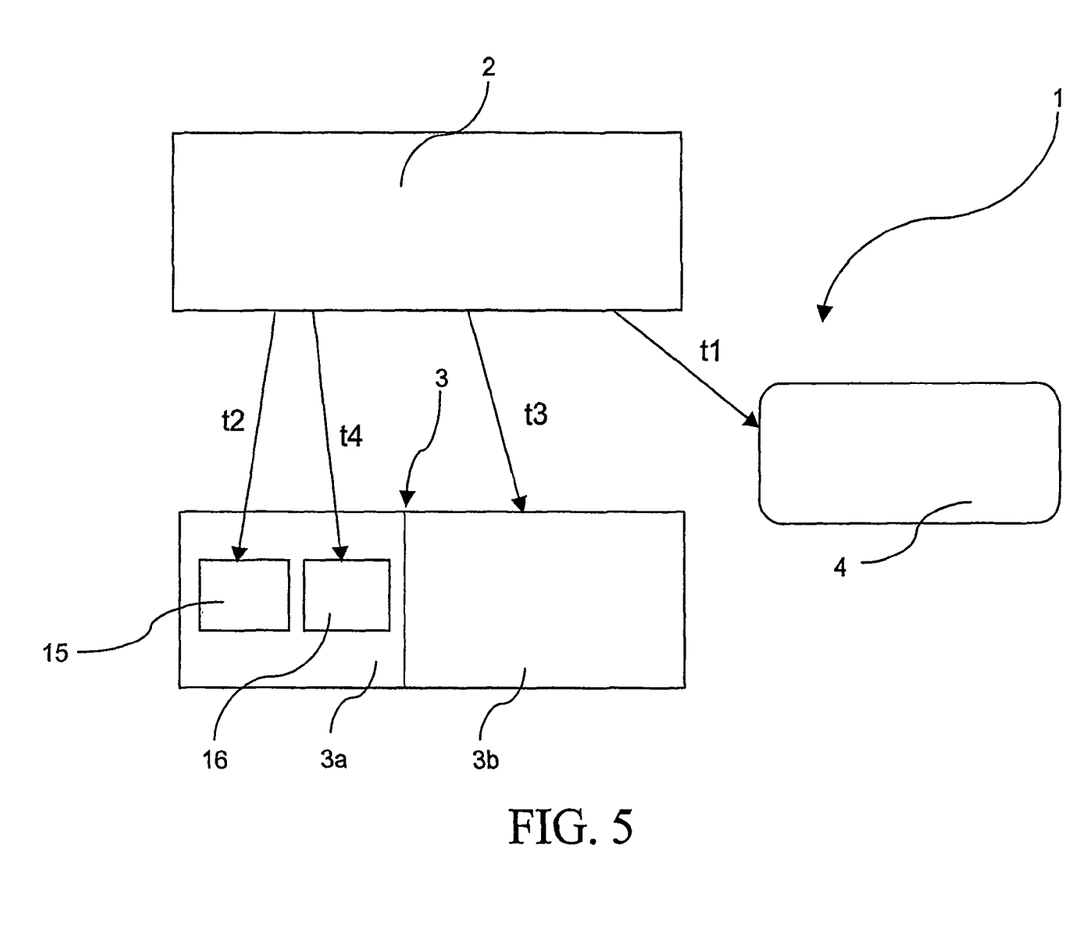
FIG. 5 is another schematic representation of a user authentication architecture according to the invention.

More specifically, in this sharing scheme, called (m,n)-threshold scheme, the template t is divided into n portions so that only m of them are needed to recompose the original template t. For example, as shown in FIG. 5, with a (3,4)-threshold scheme, the data enrolment system 2 can split the template t among the data carrier 4 ($t_1$), the server portion 3a of the data verification system 3, comprising, for example, the central server 15 ($t_2$) and a backup server 16 ($t_4$) and the client portion 3b of the data verification system 3 ($t_3$), so that only three of these systems are needed to recompose of the original template t. In this way, if the central server 15 is temporarily unavailable (or it has been compromised by an attack) the backup server 16 can replace it in the template recomposition.

The same security considerations, regarding the protection of the information exchanged between the systems involved in the template recomposition, are valid for the configurations described above, i.e. all the template portions are digitally signed and enciphered, before transmission, using the appropriate private and public keys.

Further, in each one of the above described scenarios, all the communication channels between the systems are protected by means of public key cryptography methods like the ones previously described. Thus, all the request/response messages exchanged by the systems are signed and enciphered using the appropriate private and public keys. These messages can also include a nonce for protection against replay-attacks.

For increasing the privacy, the comparison operation between the reference biometric template and the live template is performed on the data carrier 4 but, depending on the specific application requirements, it can also be performed outside the data carrier 4, for example, by the data verification system 3 (client portion or server portion).

Moreover, the Applicant outlines that biometric reference template splitting and its secure storing in the described distributed manner ensure increased resistance to template directed attacks and hence guarantee the privacy of the users.

Conventional security mechanisms (possibly based on the use of asymmetric cryptography) may also be used to guarantee the authenticity of the parties that take part to the secret sharing scheme and the confidentiality of the communication channels used.

The invention claimed is:

1. A user authentication method based on the use of identification biometric techniques comprising an enrolment step and a verification step, said enrolment step comprising the steps of:
   generating, using an image processor, a reference biometric template from a first biometric image of a user to be authenticated;
   splitting, using a computer, said reference biometric template into a first and a second reference biometric template portion;
   enciphering, using the computer, said first and second reference biometric template portions; and
   storing each one of said first and second reference biometric template portions into a different memory,
   wherein said verification step comprises the steps of:
      generating a live template from a second biometric image of said user to be authenticated;
      enciphering said live template; and
      transmitting said live template and said second reference biometric template portion to a device.

2. The method according to claim 1, wherein said step of storing each one of said reference biometric template portions into a different memory comprises the steps of:
   transmitting said first reference biometric template portion from a first system to said device, said first system operating in said enrolment step;
   storing said first reference biometric template portion into a memory of said device, said device operating in said verification step;
   transmitting said second reference biometric template portion from said first system to a second system, said second system operating in said verification step; and
   storing said second reference biometric template portion into a memory of said second system.

3. The method according to claim 2, wherein said step of splitting said reference biometric template into a first and a second reference biometric template portion comprises the step of:
   destroying said biometric template performed by said first system.

4. The method according to claim 2, wherein said step of enciphering said first and second reference biometric template portions comprises the steps of:
   storing a first and a second key and a related digital certificate into a memory of said first system, said first and second keys being respectively a public key and a private key associated with said first system;
   storing a first and a second key and a related digital certificate into said memory of said device, said first and second keys being respectively a public key and a private key associated with said user to be authenticated;
   signing said first and second reference biometric template portions with said private key of said first system; and
   enciphering said first and second reference biometric template portions with said public key of said user to be authenticated.

5. The method according to claim 4, wherein said step of enciphering said comparison biometric template comprises the steps of:
   storing a first and a second key and a related digital certificate into said memory of said second system, said first and second keys being respectively a public key and a private key associated with said second system;
   signing said live template with said private key of said second system; and
   enciphering said live template with said public key of said user to be authenticated.

6. The method according to claim 2, wherein said first and second systems are respectively a data enrolment system and a data verification system and said device is a data carrier.

7. The method according to claim 1, wherein said verification step comprises the steps of:
   deciphering said live template and said second reference biometric template portion;
   recomposing said reference biometric template from said first and second reference biometric template portions; and
   comparing said recomposed reference biometric template with said live template.

8. The method according to claim 7, wherein said verification step comprises the steps of:
   sending a result of said comparison to said second system; and
   authenticating or not authenticating said user depending on said result.

9. The method according to claim 8, wherein said step of sending a result of said comparison to said second device comprises the steps of:
   generating a message containing said result; and
   enciphering said message.

10. The method according to claim 1, wherein said step of transmitting said live template and said second reference biometric template portion to said device comprises the steps of:
    generating an aleatory value associated with the current data verification step, said aleatory value guaranteeing the authenticity of said current data verification step;
    signing and enciphering said aleatory value; and
    transmitting said aleatory value to said device.

11. The method according to claim 10, wherein said step of deciphering said live template and said second reference biometric template portion comprises the steps of:
    deciphering a signature and validity of said aleatory value;
    deciphering said second reference biometric template portion with said private key of said user to be authenticated;
    verifying a signature of the deciphered second reference biometric template portion;
    deciphering said live template with said private key of said user to be authenticated; and
    verifying a signature of the deciphered live template.

12. The method according to claim 1, wherein said identification biometric techniques comprise at least one biometric identification technique of the type selected from:
    face recognition, fingerprints, hand prints, voice templates, retinal images, and calligraphic samples.

13. The method according to claim 1, wherein said step of splitting said reference biometric template comprises the step of:
  splitting said reference biometric template into a plurality of reference biometric template portions, at least some of said reference biometric template portions being used to recompose said reference biometric template.

14. A non-transitory computer readable storage medium encoded with a computer program that can be loaded into a memory of at least one electronic processor, the computer program comprising program codes for performing the steps of the method according to claim 1, when said computer program is executed by said at least one electronic processor.

15. A user authentication architecture based on the use of biometric identification techniques comprising:
  at least one data enrolment system for generating a reference biometric template from a first biometric image of a user to be authenticated, said data enrolment system comprising a host computer to split said reference biometric template into a first and a second reference biometric template portion and for signing and enciphering said first and second reference biometric template portions;
  at least one portable data carrier associated with said user to be authenticated, said data carrier comprising a memory for storing said first signed and enciphered reference biometric template portion; and
  at least one data verification system comprising a memory for storing said second signed and enciphered reference biometric template portion,
  wherein said data carrier comprises a microprocessor comprising a processing logic for deciphering said first and second reference biometric template portions, verifying the signature and recomposing said reference biometric template from said first and second deciphered reference biometric template portions, and
  wherein said microprocessor comprises a comparing logic to compare said recomposed reference biometric template with a live template generated by a second biometric image of the user to be authenticated, said second biometric image of the user to be authenticated being generated by the data verification system.

16. A portable data carrier associated with a user that has to be authenticated through a user authentication architecture, said data carrier comprising:
  a microprocessor comprising a memory for storing a first reference biometric template portion divided from a reference biometric template received from said user to be authenticated, said first reference biometric template portion being signed and enciphered,
  said portable data carrier being adapted to receive as input, from said user authentication architecture, a second reference biometric template portion divided from said reference biometric template and a live template associated with said user, said second reference biometric template portion and said live template being signed and enciphered, said microprocessor further comprising:
  a processing logic for deciphering said first and second reference biometric template portions and for recomposing said reference biometric template from deciphered first and second reference biometric template portions; and
  a comparing logic for comparing said reference biometric template recomposed with said live template and sending a result of said comparison to said user authentication architecture.

17. The portable data carrier according to claim 16, comprising a substrate whose sizes are substantially rectangular.

18. The portable data carrier according to claim 16, wherein said data carrier is an access card or a credit card or a debit card or an identification card or a smart card or a SIM card.

19. A data verification system comprising:
  a portable data carrier associated with a user that has to be authenticated, said data carrier being adapted to store a first reference biometric template portion divided from a reference biometric template received from the user to be authenticated, said first reference biometric template portion being signed and enciphered;
  an electronic device comprising:
  a memory adapted to store a second reference biometric template portion divided from said reference biometric template, complementary to said first reference biometric template portion, said second reference biometric template portion being signed and enciphered; and
  an image acquiring and processing device for generating a live template;
  said electronic device being adapted to:
    encipher and sign said live template,
    transmit said second reference biometric template portion and said live template to said portable data carrier, and
    authenticate said user depending on a result of a comparison performed by said data carrier between said live template and said reference biometric template, said reference biometric template being rebuilt by using said first and second reference biometric template portions.

20. A data verification system comprising an electronic device and, a portable data carrier associated with a user that has to be authenticated, said data carrier being adapted to store a first reference biometric template portion associated with the user to be authenticated, said first reference biometric template portion being signed and enciphered;
  said electronic device comprising:
  a first memory adapted to store a second reference biometric template portion associated with the user to be authenticated, said second reference biometric template portion being signed and enciphered;
  at least a second memory adapted to store at least a third reference biometric template portion associated with the user to be authenticated, said third reference biometric template portion being signed and enciphered, wherein said first, second and at least third reference biometric template portions are such that a reference biometric template can be recomposed from a subset of at least two of said first, second, and at least third reference biometric template portions; and
  an image acquiring and processing device for generating a live template;
  said electronic device being adapted to encipher and sign said live template, transmitting said second reference biometric template portion and said live template to said portable data carrier and authenticating said user depending on a result of a comparison performed by said data carrier between said live template and a reference biometric template of said user to be authenticated, said reference biometric template being rebuilt by using said first and second reference biometric template portions.

* * * * *